United States Patent [19]

Ward

[11] 3,741,437
[45] June 26, 1973

[54] SEED DISPENSER HAVING SPRING BIASED SEED SELECTORS

[75] Inventor: Walter H. Ward, Vereeniging, Transvaal, South Africa

[73] Assignee: South African Farm Implement Manufacturers Limited, Vereeniging, Transvaal, South Africa

[22] Filed: Oct. 4, 1971

[21] Appl. No.: 185,978

[30] Foreign Application Priority Data
Oct. 8, 1970   Great Britain................... 47,979/70

[52] U.S. Cl...................... 221/219, 111/77, 111/78
[51] Int. Cl............................................. A01c 7/20
[58] Field of Search................... 221/187, 217, 219, 221/265; 222/176, 177; 111/77, 78

[56] References Cited
UNITED STATES PATENTS

| | | | |
|---|---|---|---|
| 3,552,601 | 1/1971 | Cordova et al. | 111/77 X |
| 3,618,820 | 11/1971 | Keeton | 111/77 X |
| 3,659,746 | 5/1972 | Winslow | 222/177 X |
| 3,622,042 | 11/1971 | Fischer | 221/265 X |
| 3,572,547 | 3/1971 | Walberg | 111/77 X |

FOREIGN PATENTS OR APPLICATIONS

| | | | |
|---|---|---|---|
| 136,972 | 8/1960 | U.S.S.R. | 111/77 |

Primary Examiner—Robert B. Reeves
Assistant Examiner—David A. Scherbel
Attorney—Robert L. Farris

[57] ABSTRACT

A seed dispenser including a seed reservoir with its lower portion connected to a seed hopper, a fixed annular seed guide having a seed discharge opening and a plurality of seed selector elements mounted on a rotatable mounting plate. The seed selector elements select seeds from the lower portion of the seed reservoir and slide the seeds along the seed guide to the discharge opening where they are ejected. The fixed annular seed guide includes a frusto-conical surface and a cylindrical surface. The seed selector elements have seed-engaging surfaces which cooperate with the frusto-conical surface to push and guide seed along the frusto-conical surface. A cam is provided to rotate the seed selector elements relative to the rotatable mounting plate to allow seed to enter the space between the seed-engaging surfaces and the annular seed guide. The annular seed guide may include a recessed portion to dislodge excess seeds carried by the selector elements. The axis of rotation of the rotatable mounting plate may be slightly offset from the axis of the annular seed guide to assist in dislodging excess seeds.

6 Claims, 11 Drawing Figures

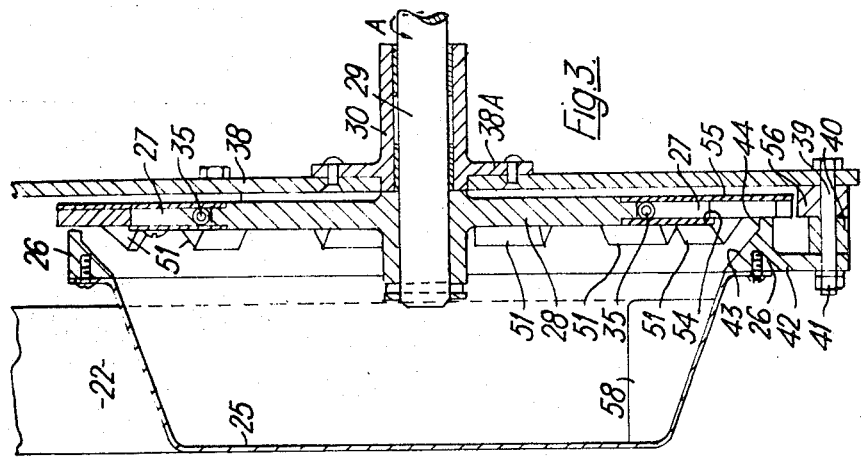

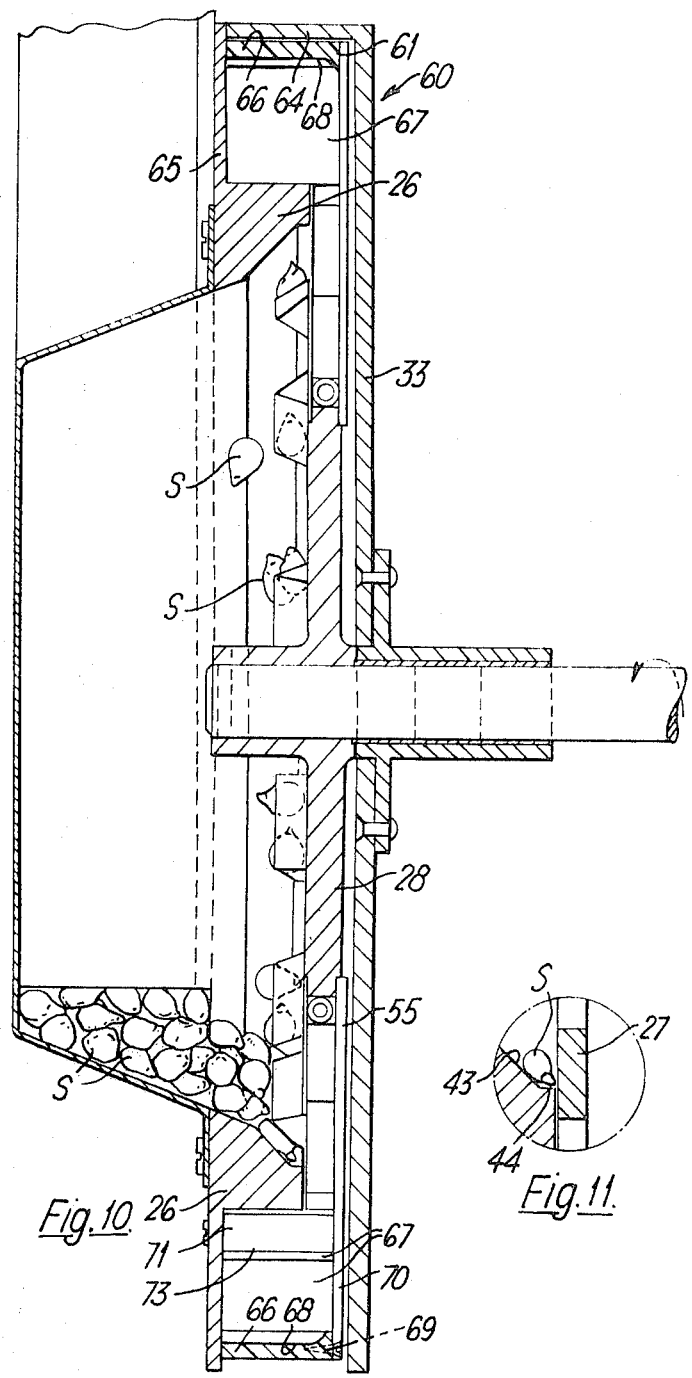

SEED DISPENSER HAVING SPRING BIASED SEED SELECTORS

This invention relates to seed dispensers of the kind comprising a series of driveable seed selector elements arranged to successively select seeds from a seed container at one level, to move the seeds over a surface extending upwardly out of the seed container, and to discharge the seeds one by one through a discharge opening.

According to the present invention there is provided a seed dispenser in which the surface extending upwardly out of the seed container is part of a seed guide member and is frusto-conical in form and the seed selector elements are mounted for pivotal movement towards and away from said surface.

Each seed selector element of a seed dispenser according to the invention may include a seed-engageable surface arranged to lie face-to-face with the frusto-conical surface as the seed selector element passes along the frusto-conical surface. The seed selector elements may be arranged in a circular series rotatable so as to move around the frusto-cone in a plane at right angles to the axis of the said cone, the pivotal movement of the selector elements being in said plane and the seed engageable surfaces being inclined to said plane so as substantially to face the frusto-conical surface. The seed-engageable surface of each selector element may be formed with one or more undulations constituting seed-pushing formations to urge seeds along the frusto-conical surface.

The invention also provides a seed planter incorporating a seed dispenser as defined in the last two preceding paragraphs.

Embodiments of the invention will now be described, by way of example, with reference to the accompanying drawings, in which:

FIG. 2 shows in side elevation a part of the seed dispenser of FIG. 1 on a larger scale and with certain parts removed for clarity;

FIG. 3 shows a cross-sectional view of the seed dispenser of FIG. 1, taken on the line A—A in FIG. 2;

Figure 6:
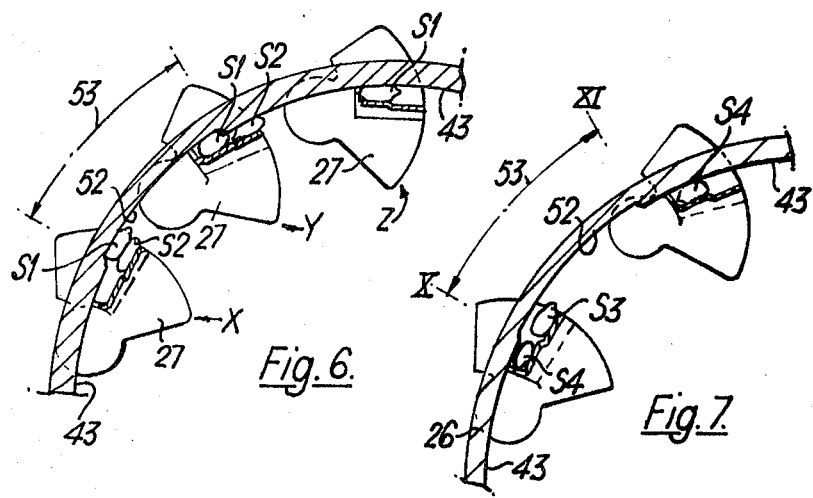
Figure 7:
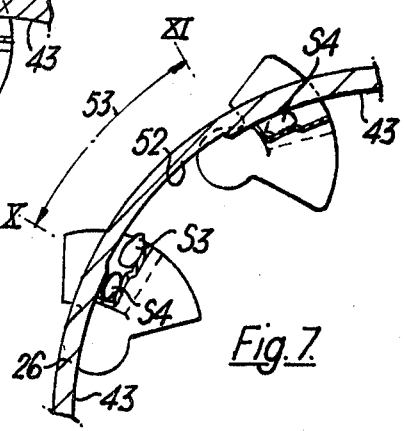
Figure 8:
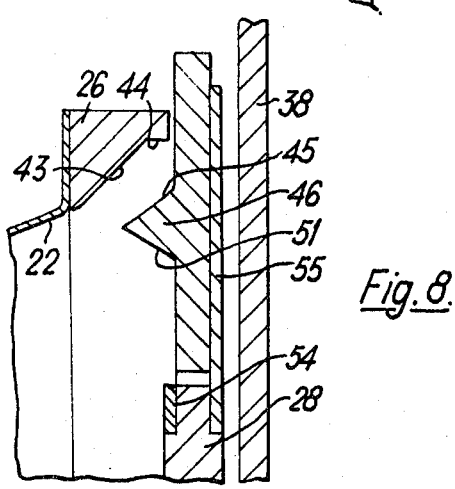
Figure 9:
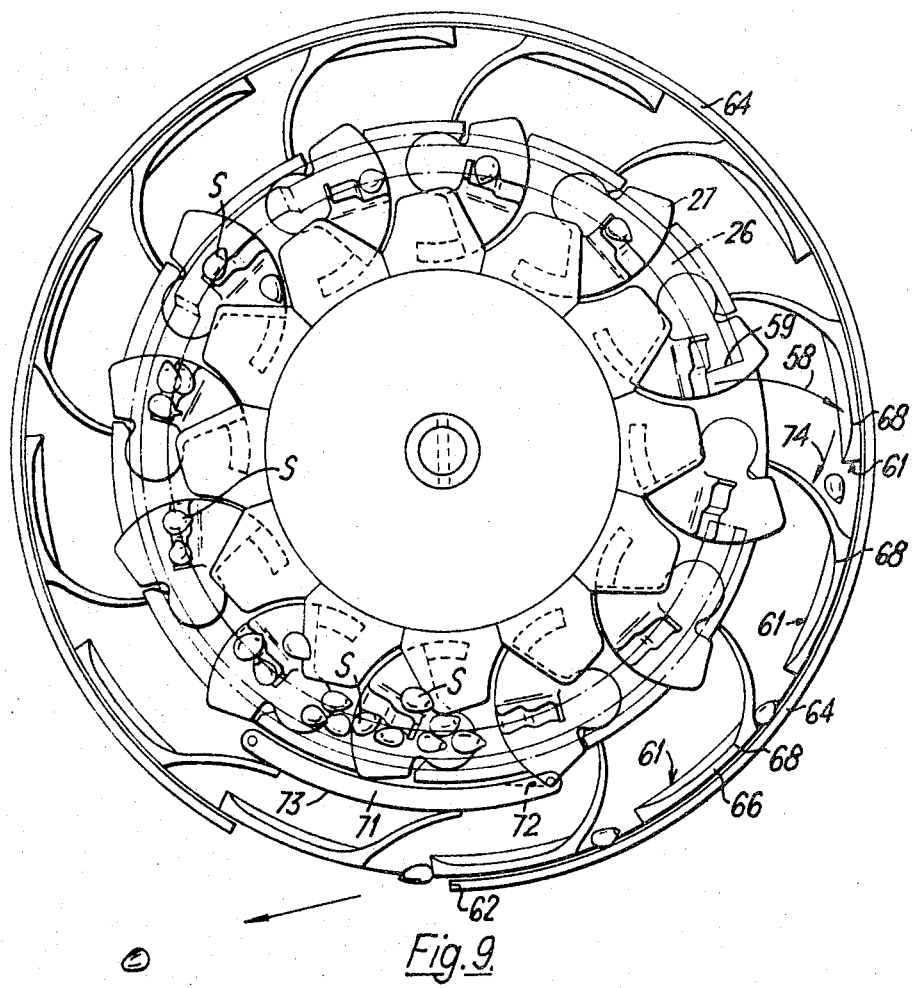

FIGS. 6 and 7 show, diagrammatically, portions of the seed dispenser mechanism as shown in FIG. 2, illustrating successive actions performed by the mechanism as seed selector elements pass between approximately the 10 o'clock and 11 o'clock positions around the periphery thereof; and FIG. 8 shows a section taken on the line VIII — VIII in FIG. 2;

FIG. 9 shows, in a view similar to that of FIG. 2, a further embodiment of the invention;

FIG. 10 shows, in a view similar to that of FIG. 3, the embodiment of FIG. 9; and FIG. 11 is a scrap view illustrating a seed S in the course of being dispensed by the mechanism either of FIGS. 1 to 8 or of FIGS. 9 and 10.

A pull-type corn (maize) planter comprises a plurality, planter units mounted in side-by-side relationship so as to simultaneously plant a plurality of rows of seeds, the spaces between the rows being of the order of 20 to 40 inches.

The planter comprises a frame carried on transport wheels which can be raised and lowered relative to the frame by a hydraulic power lift mechanism to move the frame between a raised transport position and a lowered working position. Each planter unit is mounted on the planter frame so as to be raised and lowered therewith, and the planter as a whole is arranged to be hauled by an agricultural tractor in trailed relationship thereto.

Figure 1:
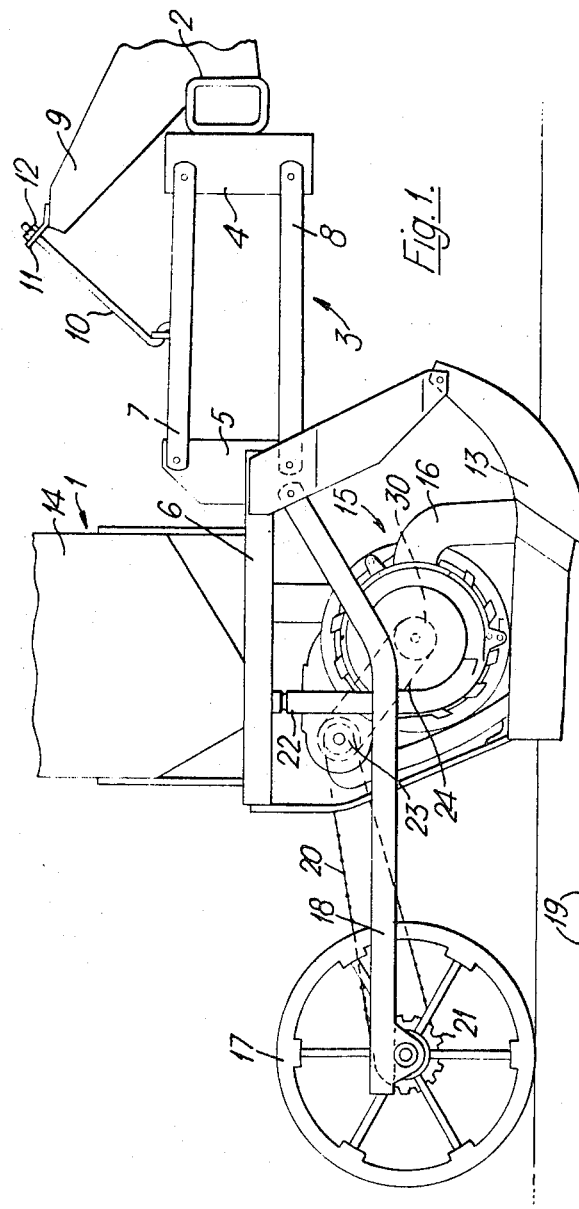
FIG. 1 shows in side elevation a planter unit incorporating a seed dispenser according to the invention.

As shown in FIG. 1 of the drawings, each planter unit 1 is mounted on a transverse rectangular-section box beam 2 constituting the main member of the planter frame, by a parallel linkage 3. The parallel linkage comprises forward and rearward support plates 4, 5, respectively, rigidly secured to the beam 2 and to a frame 6 forming part of the planter unit structure, respectively, the plates being pivotally interconnected by parallel upper and lower pairs of parallel links 7 and 8, respectively.

An upwardly and rearwardly extending arm 9 is rigidly secured to the beam 2 of the planter frame and a rod 10 secured at one end to the parallel linkage 3 extends through an apertured flange 11 at the rear end of the arm 9 and an adjustable nut 12 screw-threaded on the rod 10 provides a stop to limit downward movement of the planter unit relative to the planter frame.

The planter unit 1 comprises a runner-type furrow opener 13, a seed can or hopper 14 feeding seeds through a down pipe 22 to a seed dispenser 15 from which the seeds are fed one by one through a seed drop tube 16 to the furrow opened by opener 13. A press wheel 17 mounted on forks 18 pivotally secured to the planter unit frame 6 in trailing relationship thereto covers the seeds 19 with soil. A drive chain 20 connected to a sprocket 21 mounted on the press wheel 17 drives the seed dispenser 15 through a sprocket 23 and a drive chain 24.

The manner in which the seed dispenser 15 is constructed and arranged will now be described.

The seed dispenser 15 comprises a dish-like seed reservoir 25 connected through an inlet opening 58 formed adjacent the lowest portion of its periphery to a portion of the down pipe 22 extending tangentially with respect to the reservoir 25 to receive seeds from the hopper 14. A fixed annular seed guide and support member 26 is provided, and twelve seed selector elements 27 are rotatable about an axis parallel to, but slightly displaced from, the axis of annular seed guide member 26. The seed selector elements operate each to select a single seed out of the bottom of the seed reservoir 25, to push the seed around the seed guide member 26 in a clockwise direction as seen in FIG. 2, to discharge the seed into the seed drop tube 16 and to return to the region of the bottom of the seed reservoir to repeat the cycle.

The seed selector elements 27 are mounted on a mounting plate 28 secured to a shaft 29 for rotation therewith. The shaft 29 is supported in a bearing assembly 30 and rotated by the press wheel 17 through the chain drive mechanism 21, 20, 23, 24.

Figure 5:
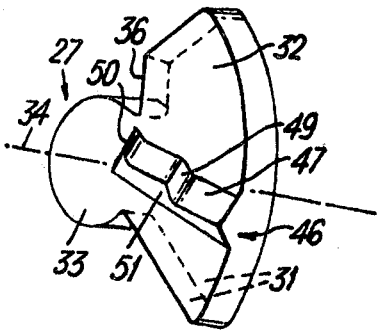
FIG. 5 shows a perspective view of a seed selector element forming part of the dispenser of FIGS. 1 to 4.

As shown in FIG. 5, each seed selector element 27 has generally flat side faces 31 and in plan view has a shape made up of a generally arcuate portion 32 corresponding in shape to a segment of a circle but with the inner portion of the segment removed, and a part-circular portion 33 joined to the arcuate portion at the radially inner edge thereof at a position slightly radially offset to one side of a symmetrical position.

The seed selector elements 27 are mounted on the plate 28 adjacent the radially outer periphery thereof. The plate 28 has portions corresponding in shape to the selector elements cut away to receive the selector elements therein at equally circumferentially spaced positions. The part-circular portion 33 of each selector element is a snug fit in the respective portion of its opening in plate 28 and thereby supports the selector element for angular movement about the central axis 34 of the part-circular portion. Such angular movement results in the arcuate portion 32 of each selector element being moved generally radially outwardly with respect to mounting plate 28.

Each seed selector element 27 is urged to move outwardly about axis 34 by a coiled compression spring 35 located at one end in an opening formed in the mounting plate 28 and acting at its other end on one side edge of the arcuate portion of the selector element. Outward movement of each selector element is limited by engagement of one radially inner edge 36 of the selector element with an abutment 37 constituted by an edge of that portion of the mounting plate 28 in which the selector element is mounted. The selector elements are each supported and guided in their inward and outward movement and located against axial movement by respective pairs of locating plates 54, 55 detachably secured to the mounting plate 28 one on each axially-facing side of each selector element.

The annular seed guide member 26 is non-rotatably mounted on the bearing assembly 30 so as to be stationary relative to the seed selector members 27 as follows. A circular back plate 38 is riveted to an annular flange 38A of bearing assembly 30, and an annular web 42 carrying the seed guide member 26 at its radially inner periphery is secured to the radially outer periphery of the back plate 38 by three bolts 39 and associated spacers 40 and nuts 41 on each bolt.

The radially inwardly-facing surface of the annular seed guide member 26 comprises a frusto-conical portion 43 and a short cylindrical portion 44. These two surfaces serve to guide seeds from the bottom of the seed reservoir 25 to the entrance to the seed drop tube 16. The seed reservoir 25 is detachably mounted on the seed guide member 26.

A seed-engaging surface 45 is formed on each seed selector 27 to cooperate with frusto-conical surface 43 and cylindrical surface 44 in selecting, supporting, pushing and guiding a seed from the seed reservoir 25 to the seed drop tube 16. The seed-engaging surface 45 of each seed selector 27 is constituted by one side 45 of a rib 46 formed on one side of each seed selector.

Seed-engaging rib 46 extends from the radially outer edge of arcuate portion 32 of each selector 27 to a position just inside the part-circular portion 33 thereof. A section through rib 46 in a direction transverse to its length is generally triangular in shape, as shown in FIG. 8.

Figure 4:
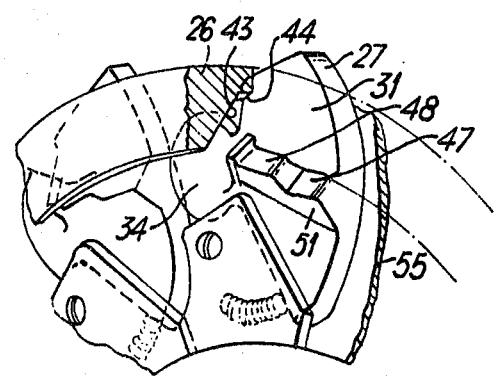
FIG. 4 shows a perspective view of a portion of the dispenser of FIG. 2 at the "twelve o'clock" position as seen in FIG. 2.

The seed-engaging surface 45 of rib 46 comprises first and second generally flat portions 47, 48 lying in planes which are substantially parallel to each other and inclined at an angle of approximately 45° to the plane of the surface 31 of the seed selector element. Between the first and second portions of the seed-engaging surface 45 is a third generally flat portion 49 constituting a step between the first and second portions. At the radially inner end of rib 46, seed-engaging surface 45 terminates in a short transverse upstanding rib 50. The radially outer end of surface 45 is rounded or profiled to provide a convex edge rather than a line edge. As shown in FIGS. 4 and 8, surfaces 47 and 48 are arranged face-to-face with conical surface 43 of seed guide member 26.

On the side of rib 46, remote from the seed-engaging surface 45, the other longitudinally-extending surface 51 of the rib may be formed with a profile similar to that of surface 45, or it may be flat. The surface 51 does not cooperate with the seeds, i.e. it is a non-working surface, and its form may be chosen in the interest of simplicity of manufacture.

The frusto-conical surface 43 of the annular seed guide member 26 is formed with a slightly recessed portion 52 (see FIGS. 6 and 7) extending along a portion 53 of its length. With reference to Roman numeral XII in FIG. 2 as the 12 o'clock position on a clock face, it will be seen that the recessed portion 52 of frusto-conical surface 43 extends between the 10 and 11 o'clock positions approximately.

A ramp 56 for engagement with the selector elements to move them angularly inwardly about axis 34 for a purpose to be described extends between approximately the six and seven o'clock positions around the annular seed guide member 26. The ramp 56 is mounted at one end on one of the bolts 39 supporting seed guide member 26 (a shorter spacer 40 being provided for this purpose) and at its other end on a further bolt 57 secured to the seed guide member 26.

The seed guide member 26 is interrupted between positions corresponding approximately to half-past two and half-past three, for seeds to be discharged into seed drop tube 16.

The manner of operation of the seed dispenser 15 is as follows:

Seeds entering the reservoir 25 through the inlet opening 58 slide towards the rotating mounting plate 28, forming a pool of seeds through which the selector elements 27 pass. The pool of seeds tends to block inlet 58 thereby automatically limiting the flow of seeds into reservoir 25 in accordance with the quantity of seeds in the pool.

Considering now the sequence of operations performed by each seed selector 27 as it rotates with mounting plate 28, as the seed selectors pass the discharge opening at the entrance to seed drop tube 16 their outward movement about pivot axis 34 is restrained only by engagement of their edges 36 with abutments 37 of the mounting plate 28. In this position the seed engaging surface 45 of the rib 46 is face-to-face with and close to the frusto-conical surface 43 of the seed guide member 26, defining a gap of which the leading end is slightly wider than the trailing end. As the selector elements 27 move clockwise their leading edges successively ride up ramp 56, causing inward angular movement of the selector elements about axis 34. This movement opens up the gap between the seed-engageable surfaces 43 and 45 and although the surfaces remain in generally "parallel" face-to-face relationship, the chamfered leading edge of the seed engaging surface 45 of rib 46 makes the leading end or mouth of the gap somewhat wider than its trailing end or throat.

As the selector elements 27 ride over ramp 56 they pass through the pool of seeds supplied from reservoir 25 and one or two seeds are trapped in the gap between the seed engaging surfaces of the selector elements and seed guide 26. More specifically, a first seed may be trapped between the frusto-conical surface 43 and the second portion 48 of the surface 45, and a second seed may be trapped between the frusto-conical surface 43 and the first portion 47 of the surface 45.

While the selector element rides over the ramp 56 the seeds are only located between the respective seed-engaging surfaces. When the selector element has passed the ramp, however, the compression spring 35 moves the selector element outwardly. This moves the surface 45 towards the frusto-conical surface 43 and the seeds are then positively gripped between these surfaces.

During movement of each selector element between approximately the eight and nine o'clock positions any loose seeds lodged on the selector element drop off and at approximately the 10 o'clock position the seeds ride into the recessed portion 52 of the frustoconical surface 43. As shown in FIG. 6, if two seeds, S1, S2 are located one on top of the other in the gap between the surface 43 and the first portion 47 of the surface 45 as they approach the recessed portion 52 of the surface 43, the seeds ride into the recessed portion 52 without any change in their relative positions (see seed selector element "X" in FIG. 6), but when the radially outer seed S1 engages the shoulder formed in the seed guide member 26 at the end of the recessed portion 52 the seed S1 is pushed back behind seed S2 to the position it occupies in relation to the seed selector element "Y" in FIG. 6 in which it is trapped between surface 52 and the second portion 48 of the surface 45. On further movement of the seed selector elements around the seed guide member 26, the rib 50 pushes seed S1 over the shoulder at the end of surface 52. This forces the seed selector element a short distance inwardly so that seed S2 which has already ridden over the shoulder is no longer properly gripped between the seed-engaging surfaces and is able to fall radially inwardly (see FIG. 4) with respect to the annular seed guide member and return to the pool of seeds at the lowest level thereof.

If on the other hand two seeds S3, S4 are located one behind the other in the gap between surface 43 and respectively the first and second portions 47, 48 of surface 45 (as shown in FIG. 7), the leading seed S3 ceases to be gripped as soon as it rides into recessed portion 52 and is dropped and returned to the seed pool.

It is to be understood that this seed dispenser is intended for use with maize irrespective of whether the seeds have been size-graded or not and accordingly it may happen that two seeds which differ in size to a substantial extent may be picked up by one seed selector element. In such circumstances the difference in size of the two seeds or the difference in attitude of the seeds may have the result that the sequence of operations described above in which one of the two seeds is returned to the seed reservoir may not occur. However, in this situation the net result of the seed selector element passing recessed portion 52 is that the two seeds are in all cases located one behind the other when they have passed the portion 52 and the grip on the leading seed has been modified in preparation for it to be dropped. This factor, in combination with the small amount of eccentricity between the axes of seed guide member 26 and mounting plate 28 which itself results in a diminished grip on the seeds in the upper left hand portion as seen in FIG. 2 of their travel around seed guide surface 43 (i.e. between about the seven o'clock and 12 o'clock positions) results in the leading seed being dropped and returned to the seed pool at some time in the travel of the seed selector 27 between passing the recessed portion 52 and passing the 12 o'clock position.

As a result of the operations described above each seed selector element 27 approaches the entrance to the seed drop tube 16 with a single seed trapped between the surface 48 (See FIG. 5) and frusto-conical surface 43. At the entrance to the seed drop tube seed guide member 26 terminates and the coiled compression spring 35 of the selector element flicks the selector element outwardly, bringing the radially inner edge 36 of the selector element into engagement with the abutment 37 on the mounting plate 28. This flicking action ejects the seed into the drop tube 16, down which it passes to be deposited into the furrow opened by the runner opener 13. Having ejected its seed each selector element returns to the seed pool and the sequence of operations described above is repeated.

The embodiment illustrated in FIGS. 9 and 10 includes an alternative seed discharge mechanism for the seed dispenser but is otherwise constructed and arranged as in the embodiment described above.

In the embodiment of FIGS. 9 and 10 seeds are ejected from the seed dispenser at approximately the six o'clock position, as seen in FIG. 9, instead of at approximately the three o'clock position as in the previous embodiment.

The inter-relationship of the seed selector elements 27 and the seed guide members 26 is as in the previous embodiment and accordingly seeds are ejected in a generally radially outward direction as shown by arrow 58 in FIG. 9, at the end 59 of seed guide member 26. Instead of entering a seed drop tube at this position the seeds enter an annular discharge channel 60 (see FIG. 10) and are carried round in the discharge channel between paddle members 61 until they reach an opening 62 (See FIG. 9) in the channel where the seeds enter a drop tube (not shown) leading to runner furrow opener 13.

As shown in FIG. 10 discharge channel 60 is constituted by the radially-extending radially outer portion 63 of circular back plate 38, by an axially-extending cylindrical flange 64 formed at the radially outer edge of portion 63 and by a radially-extending flange 65 formed at the radially outer edge of seed guide member 26.

The paddle members 61 are formed from a polyamide plastics material such as nylon and each comprise a generally circumferentially extending base portion 66 and a generally radially inwardly extending flexible curved tongue portion 67 formed at one end of the base portion. Both the base and tongue portions of each paddle member extend across substantially the full axial width of the annular discharge channel 60. The radially inwardly facing surface of the base portion 66 of each paddle member is formed with a shallow dome-shaped recess 68 extending across a major portion of the width of the base portion from one circumferentially-extending side edge thereof.

Twelve paddle members 61 are provided, one for each seed selector element 27. Each paddle member is secured by screws 69 to a radially outwardly-extended portion 70 of the respective locating plate 55 at a position circumferentially staggered with respect to the respective seed selector element.

A modified ramp 71 corresponding to ramp 56 in the previous embodiment is provided. The ramp extends across substantially the full width of the space between flange 65 and outer portions 70 of the plates 55, and has a tapered leading edge providing a surface 72 for engagement with the seed selector elements 27. The radially outwardly facing surface 73 of the ramp 71 is smoothly curved to allow the trailing ends of the tongues 67 of the paddle members 67 to deflect and ride over it smoothly.

The manner of operation of the seed discharge mechanism of FIGS. 9 and 10 is as follows:

The paddle members 61 rotate with the seed selector elements 27 on the mounting plate 28. When a seed is ejected by its seed selector element at the gap 59 in the seed guide member 26 it strikes the recessed surface of the base portion 66 of its respective paddle member 61 and is deflected downwardly in a generally circumferential direction as shown by arrow 74 (FIG. 9) and becomes lodged against the rear end of the preceding paddle member (see seed 75 at approximately the four o'clock position in FIG. 9).

Upon further circumferential movement over the radially inwardly-facing surface of the non-rotating flange 64 from the position of the seed 75 a seed begins to slow down and begins to be caught up by the succeeding paddle member (see seed 76 at approximately the five o'clock position). Before the seed reaches the gap 62 in the flange 64 it is caught up by the leading edge of the succeeding paddle member which pushes it over the edge of the gap and into the seed discharge tube (not shown).

It will be noted that in FIGS. 9 and 10 the positions of the seeds S in each portion of the dispensing mechanism has been indicated to illustrate the sequence of operations described above in relation to both the first and second embodiments of the invention, which results in seeds being delivered one by one in regular sequence to the furrow opener 13.

In both of the embodiments described above the seed selector elements 27 are formed from a polyamide plastics material.

The seed dispensers described above are capable of efficiently dispensing the widely differing sizes and shapes of seed normally encountered in maize seed. Furthermore the dispensers can easily be incorporated in known planter constructions to replace the known seed dispensing mechanisms of such machines.

The embodiments of the invention described above include both a recessed portion 52 in the frusto-conical surface 43 and a degree of eccentricity in the positions of the axes of the seed guide member 26 and the mounting plate 28 in order to return to the seed reservoir excess seeds picked up by the selector elements. However, it is not essential to include both of these features in order to achieve satisfactory excess seed return performance. Either feature may be used on its own, though where eccentricity alone is relied upon a greater degree of eccentricity is required than that present in the embodiments described above.

In a further embodiment (not illustrated) two seed dispensers as described above are mounted side by side with a common seed food and seed outlet, the seed selector members of one dispenser being circumferentially staggered with respect to the selector members of the other dispenser. This results in seeds being dispensed at regular intervals but at twice the rate (for a given rate of rotation of the dispenser drive shaft) which is achieved with a single dispenser. This embodiment is suitable for planting crops such as beans and peas which require closer seed spacing than maize, and allows a satisfactory ground speed to be used while planting such crops without requiring an unduly high seed selector element speed.

I claim:

1. A seed dispenser characterized by an a relatively stationary annular seed guide with a discharge aperture, a rotatable mounting plate rotatable about an axis, at least one seed selector pivotally mounted on the rotatable mounting plate for pivotal movement about an axis generally parallel to the axis of rotation of the mounting plate, at least one surface on the seed selector that engages seed to hold seed against said annular seed guide and conveys the seed along the annular seed guide, cam means to pivot the seed selector relative to the mounting plate, a seed supply means and drive means to rotate the rotatable mounting plate with the seed selector to remove seed from the seed supply, slide the seed along the surface of the annular seed guide and to discharge seed through the discharge aperture.

2. The seed dispenser of claim 1 characterized by the annular seed guide including a frusto-conical surface along which seed is slid by the seed selector.

3. The seed dispenser of claim 1 characterized by the rotatable mounting plate including a stop surface, the seed selector including a first stop surface which contacts the stop surface on the rotatable mounting plate to limit pivotal movement of the seed selector relative to the rotatable mounting plate in one direction and resilient means to bias the first stop surface on the seed selector toward the stop surface on the mounting plate.

4. The seed dispenser of claim 3 characterized by the cam means, for pivoting the seed selector, contacting the seed selector to pivot the seed selector relative to the rotatable mounting plate against the resilient means to open a space between the seed selector and the annular seed guide for receiving seed from the seed supply.

5. The seed dispenser of claim 1 characterized by the annular seed guide including a recessed portion for dislodging excess seeds carried between the seed selector and the annular seed guide.

6. The seed dispenser of claim 1 characterized by an annular discharge channel with a discharge opening surrounding the seed guide and at least one paddle member in the discharge channel operatively connected to rotate with the rotatable mounting plate.

* * * * *